United States Patent
Ishii et al.

(10) Patent No.: US 12,194,776 B2
(45) Date of Patent: Jan. 14, 2025

(54) VEHICLE EQUIPPED WITH OMNI-DIRECTIONAL WHEELS

(71) Applicant: TOYOTA JIDOSHA KABUSHIKI KAISHA, Toyota (JP)

(72) Inventors: Daisuke Ishii, Sunto-gun Shizuoka-ken (JP); Daisuke Sato, Susono (JP); Hiroki Izu, Nagoya (JP); Hiroki Morita, Hiratsuka (JP); Kei Sato, Toyota (JP); Masaki Nanahara, Toyota (JP); Kazumi Serizawa, Toyota (JP); Hironobu Tanaka, Shinagawa-ku Tokyo-to (JP); Shunsuke Mogi, Hachioji (JP); Takashi Hayashi, Nagoya (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 594 days.

(21) Appl. No.: 17/492,962

(22) Filed: Oct. 4, 2021

(65) Prior Publication Data
US 2022/0105750 A1    Apr. 7, 2022

(30) Foreign Application Priority Data

Oct. 6, 2020  (JP) ................. 2020-169399

(51) Int. Cl.
| | | |
|---|---|---|
| *B60B 19/00* | (2006.01) | |
| *B60G 17/016* | (2006.01) | |
| *B60S 9/205* | (2006.01) | |
| *B62D 51/02* | (2006.01) | |

(52) U.S. Cl.
CPC .......... *B60B 19/003* (2013.01); *B60G 17/016* (2013.01); *B60S 9/205* (2013.01); *B60G 2500/30* (2013.01); *B62D 51/02* (2013.01)

(58) Field of Classification Search
CPC ................. B60S 9/02; B60S 9/10; B60S 9/14
USPC ........................................... 280/763.1, 6.153
See application file for complete search history.

(56) References Cited

U.S. PATENT DOCUMENTS

| | | | |
|---|---|---|---|
| 4,913,458 A * | 4/1990 | Hamilton .................. | B60S 9/10 348/148 |
| 5,535,843 A | 7/1996 | Takeda et al. | |
| 8,235,419 B1 * | 8/2012 | Giarrusso .............. | B62K 11/06 280/301 |
| 2011/0162896 A1 * | 7/2011 | Gillett ................... | B60K 35/10 180/2.2 |

(Continued)

FOREIGN PATENT DOCUMENTS

| | | |
|---|---|---|
| CN | 2602977 Y | 2/2004 |
| JP | S50-95924 A | 7/1975 |

(Continued)

*Primary Examiner* — Christopher B Wehrly
(74) *Attorney, Agent, or Firm* — Dinsmore & Shohl LLP

(57) ABSTRACT

A vehicle equipped with a plurality of omni-directional wheels includes a grounding part that supports the vehicle by grounding to a ground surface, a moving mechanism to protrude the grounding part from the bottom of the vehicle toward the ground surface, and a controller for controlling the moving mechanism so as to ground said grounding part to the ground surface. The controller is configured to control the moving mechanism so as to ground the grounding part to the ground surface when the vehicle is detected to have stopped.

4 Claims, 8 Drawing Sheets

(56) References Cited

U.S. PATENT DOCUMENTS

| | | |
|---|---|---|
| 2019/0225195 A1 | 7/2019 | Shirouzu et al. |
| 2020/0039477 A1* | 2/2020 | Hernandez ............. B60Q 1/326 |
| 2021/0089037 A1 | 3/2021 | Fukuoka et al. |

FOREIGN PATENT DOCUMENTS

| | | |
|---|---|---|
| JP | S56-167539 A | 12/1981 |
| JP | H07-172340 A | 7/1995 |
| JP | 2014-046890 A | 3/2014 |
| JP | 2018-125816 A | 8/2018 |
| JP | 2019-127116 A | 8/2019 |
| WO | 2020/054733 A1 | 3/2020 |

* cited by examiner

VEHICLE EQUIPPED WITH OMNI-DIRECTIONAL WHEELS

CROSS-REFERENCE TO RELATED APPLICATION

The present application claims priority under 35 U.S.C. § 119 to Japanese Patent Application No. 2020-169399, filed Oct. 6, 2020, the contents of which application are incorporated herein by reference in their entirety.

BACKGROUND

Field

The present disclosure relates to a vehicle equipped with omni-directional wheels and, in particular, to vehicle safety techniques having omni-directional wheels.

Background Art

Japanese Patent Application Laid-Open No. 2014-46890 discloses a technique related to an omni-directional movement cart equipped with omni-directional wheels. In this technology, the cart is instantaneously assisted in all directions by the power assist function by the omni-directional wheels.

SUMMARY

The omni-directional wheels are wheels that can move not only in the direction of wheel rotation (i.e., front-to-back direction of the vehicle), but also in the left-right direction of the vehicle. However, the omni-directional wheel has one aspect of lacking stationary stability of the vehicle in the lateral direction due to its structure. For this reason, vehicles with omni-directional wheels have a problem in keeping the vehicle stopped reliably on unstable ground surfaces such as inclined surfaces.

The present disclosure has been made in view of the problems as described above, and an object thereof is to provide a vehicle equipped with omni-directional wheels capable of increasing the braking force of the vehicle in stop.

To solve the above problems, a first disclosure is applied to a vehicle equipped with a plurality of omni-directional wheels. The vehicle includes a grounding part that supports the vehicle by grounding to a ground surface, a moving mechanism to protrude the grounding part from the bottom of the vehicle toward the ground surface, and a controller for controlling the moving mechanism so as to ground said grounding part to the ground surface.

The second disclosure further includes the following features in the first disclosure.

The controller is configured to control the moving mechanism so as to ground the grounding part to the ground surface when the vehicle is detected to have stopped.

The third disclosure further includes the following features in the first disclosure.

The controller is configured to control the moving mechanism to ground the grounding part to the ground surface when an operation request is received from an occupant.

The fourth disclosure further includes the following features in the first disclosure.

The moving mechanism is a jack which is integrally configured with the grounding part, and is fixed to the bottom of the vehicle.

The fifth disclosure further includes the following features in the first disclosure.

The vehicle includes a spring lower structure including the plurality of omni-directional wheels, a spring upper structure including a deck for carrying an occupant, and a ride height adjusting mechanism coupled between the spring lower structure and the spring upper structure. The grounding part is mounted so as to protrude from the spring upper structure toward the ground surface. The moving mechanism is configured to include the ride height adjusting mechanism. The controller is configured to ground the grounding part to the ground surface by driving the ride height adjusting mechanism to adjust the vertical relative position of the spring upper structure with respect to the spring lower structure.

According to the first disclosure, the vehicle equipped with omni-directional wheels is provided with a moving mechanism that protrudes the grounding part from the bottom of the vehicle toward a ground surface. According to such a configuration, in the vehicle equipped with omni-directional wheels having a problem in the stop stability with respect to the lateral direction of the vehicle, it is possible to increase the braking force by grounding the grounding part to the ground.

According to the second disclosure, the moving mechanism is controlled so as to ground the grounding part to the ground surface when it detects that the vehicle has stopped. This can prevent the stopped vehicle from unintentionally moving. According to the third disclosure, the moving mechanism may be controlled to ground the grounding part to the ground surface in response to an operation request of the occupant.

According to the fourth disclosure, the moving mechanism is configured as a jack integrally configured with the grounding part. According to such a configuration, it is possible to increase the braking force during stopping of the vehicle by a simple configuration. Further, according to the fifth disclosure, by utilizing the ride height adjusting mechanism, it is possible to ground the grounding part to the ground.

DETAILED DESCRIPTION

Hereinafter, an embodiment of the present disclosure will be described with reference to the accompanying drawings.

However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically.

1. First Embodiment

1-1. Schematic Structure of Automated Traveling Pallet

Figure 1:
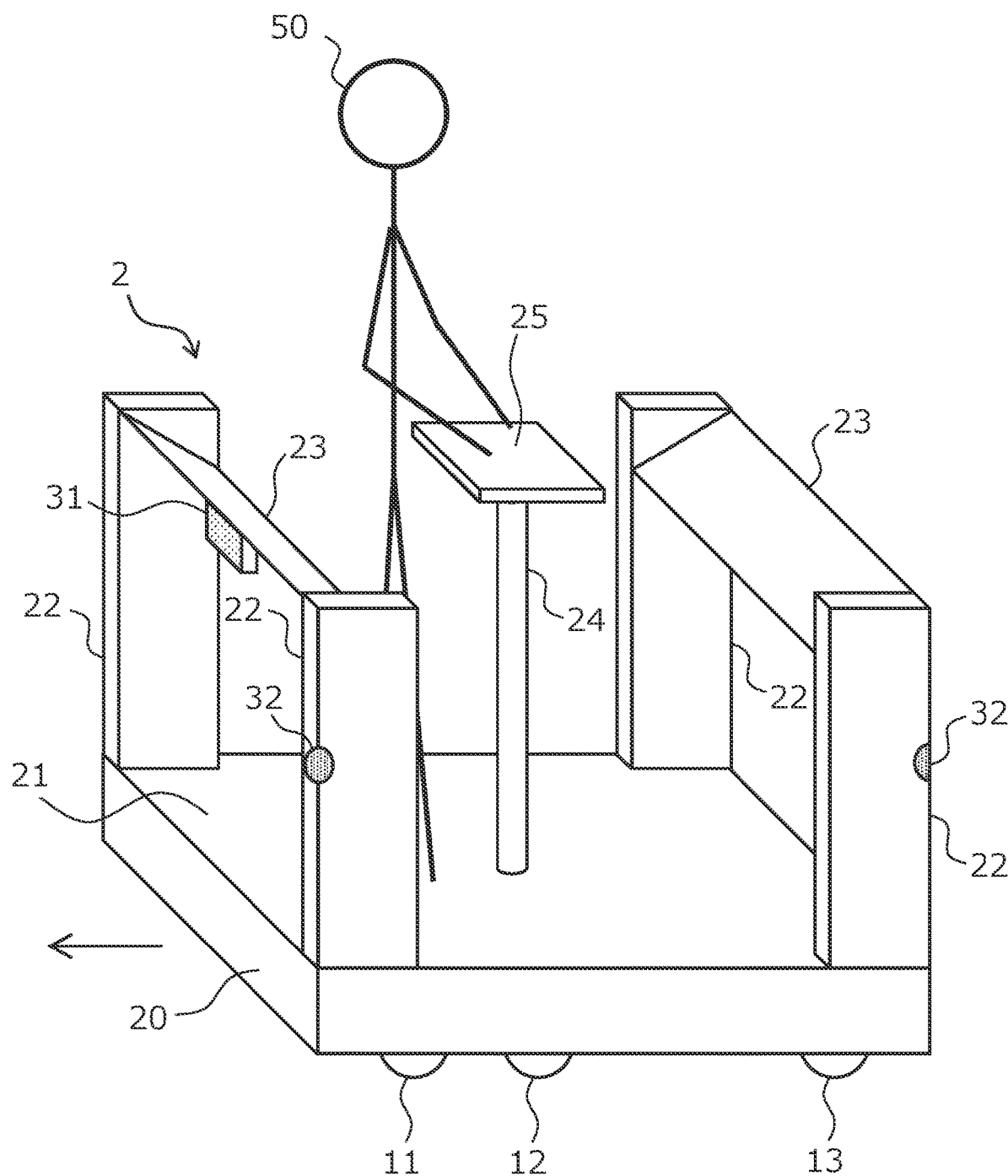
FIG. 1 is a diagram showing a schematic structure of an automated traveling pallet of a first embodiment.

FIG. 1 is a diagram showing a schematic structure of an automated traveling pallet of the first embodiment. An automated traveling cart 2 according to the present embodiment is an automated traveling cart having a pallet-type vehicle body 20. In the following description, the automated traveling cart 2 according to the present embodiment is referred to as an automated traveling pallet.

The automated traveling pallet 2 is a low-floor vehicle whose height of a deck 21 of the vehicle body 20 is about 30 cm from the ground surface. At the bottom of the vehicle body 20, front wheels 11, middle wheels 12, and rear wheels 13 are provided on each side. These wheels 11, 12, 13 can make the automated traveling pallet 2 travel in either the left and right direction in FIG. 1. Here, the leftward direction is assumed to be a basic traveling direction of the automated traveling pallet 2 as indicated by an arrow in the drawing. Then, the traveling direction in front of the automated traveling pallet 2, and defines the opposite direction as the rear of the automated traveling pallet 2.

Support posts 22 are erected at the front and rear of the deck 21 on each side. A beam 23 is stretched between the left support post 22 and right support post 22 at the front. Similarly, although hidden in FIG. 1, the beam 23 is stretched between the left support post 22 and right support post 22 at the rear. The beam 23 can be used as a seat for at least one occupant 50 riding on the deck 21. A small table 25 supported by a leg 24 is provided at the central of the deck 21.

The automated traveling pallet 2 is provided with external sensors for autonomous traveling. A first external sensor is a LIDAR 31: Laser Imaging Detection and Ranging. The LIDAR 31 are provided on the front upper and the rear upper portions of the automated traveling pallet 2 so as to respectively sense the front and rear of the automated traveling pallet 2. In FIG. 1, only the LIDAR 31 of the front upper portion is visible. A second external sensor is cameras 32. The cameras 32 are provided on the each support post 22 so as to capture the right front, left front, right rear, and left rear of the automated traveling pallet 2. In FIG. 1, the left front and left rear cameras 32 are visible.

In addition, although the application will be described later, a touch panel 38 as an HMI is attached to the outside of one of the support posts 22.

Figure 2:
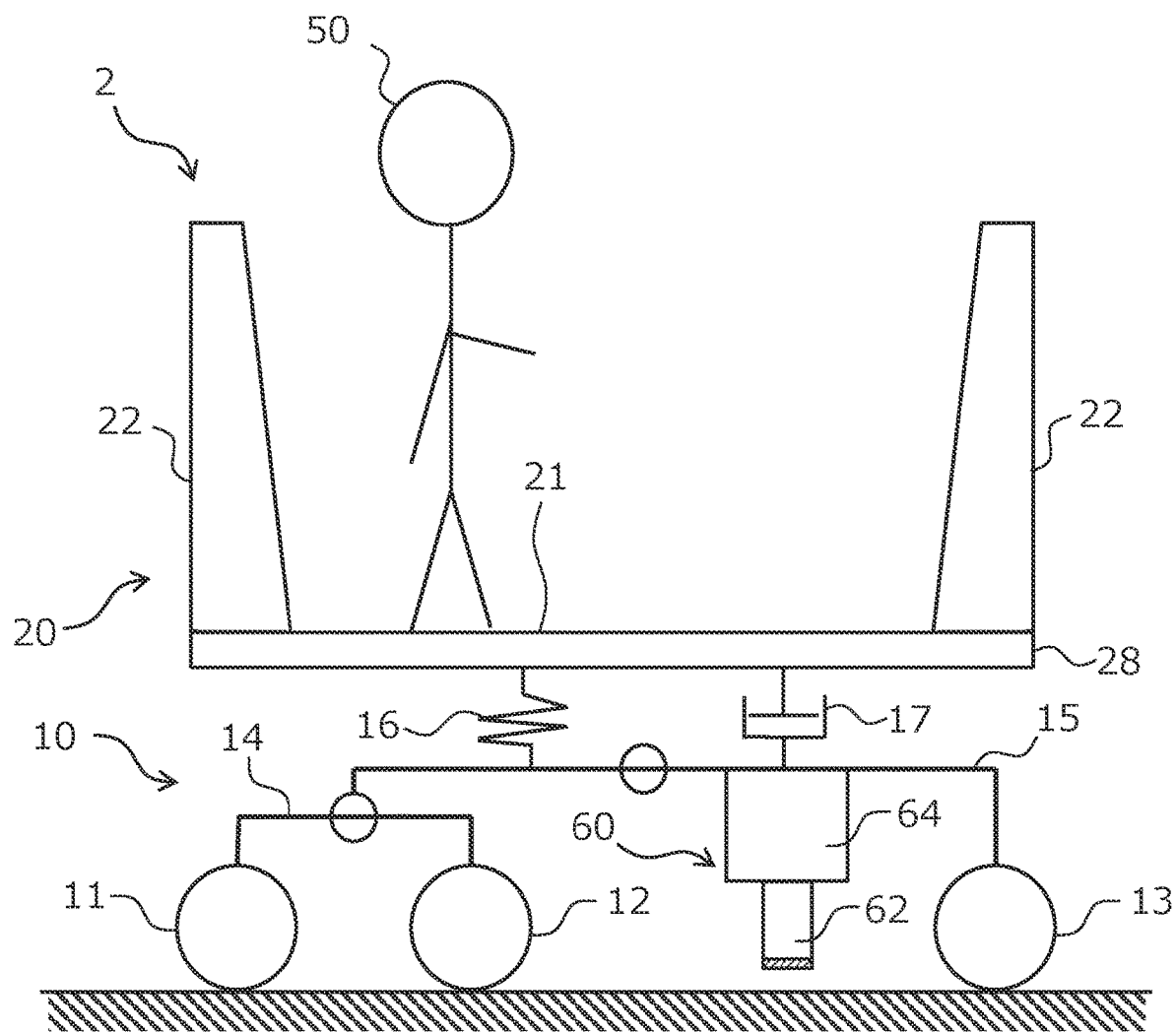
FIG. 2 is a diagram for explaining a schematic structure of a vehicle body and a chassis of the automated traveling pallet.

Next, a schematic structure of the vehicle body 20 and a chassis 10 of the automated traveling pallet 2 will be described with reference to FIG. 2. Front wheels 11, middle wheels 12, and rear wheels 13 are mounted on the chassis 10. Each wheel 11, 12, 13 is driven by an independent motor (not shown) and can rotate at a speed and direction independent of each other. Specifically, although the middle wheels 12 are normal wheels, the front wheels 11 and the rear wheels 13 are omni-directional wheels. That is, the automated traveling pallet 2 is a vehicle equipped with omni-directional wheels.

The chassis 10 includes a bogie 14 and a rocker 15. The front wheels 11 and the middle wheels 12 are supported by the bogie 14. Specifically, a motor for driving the front wheel 11, and a motor for driving the middle wheel 12 is mounted on the bogie 14. The bogie 14 is swingably supported with respect to the rocker 15. A motor for driving the rear wheels 13 is mounted on the rocker 15. Further, although not shown, a small battery having a high volume energy density, such as a lithium ion battery is mounted on the rocker 15.

On top of the rocker 15, the vehicle body 20 is mounted via a spring 16 and a damper 17. That is, the vehicle body 20 corresponds to a spring-top structure, the chassis 10 corresponds to a spring-bottom structure, and the spring 16 and the damper 17 correspond to a suspension device connected between the spring upper structure and the spring lower structure.

The body 20 has an upper plate 28 that rests on the spring 16 and the damper 17. The upper surface of the upper plate 28 is a deck 21, the support posts 22 are attached to the upper plate 28.

The front wheels 11 and the rear wheels 13 are omni-directional wheels do not have a reliable braking function, especially for the left and right direction, unlike the middle wheels 12 which are normal wheels. Therefore, the automated traveling pallet 2 is equipped with a jack 60 under the rocker 15 of the chassis 10 as an additional brake device. The jack 60 is a lifting device that integrally consists of a grounding part 62 and an electric moving mechanism 64. The grounding part 62 supports the automated traveling pallet 2 by grounding to the ground surface. The moving mechanism 64 protrudes the grounding part 62 toward the ground surface from the bottom of the automated traveling pallet 2. The jacks 60 are provided at two positions in the vicinity of the pair of rear wheels 13, for example.

Figure 3:
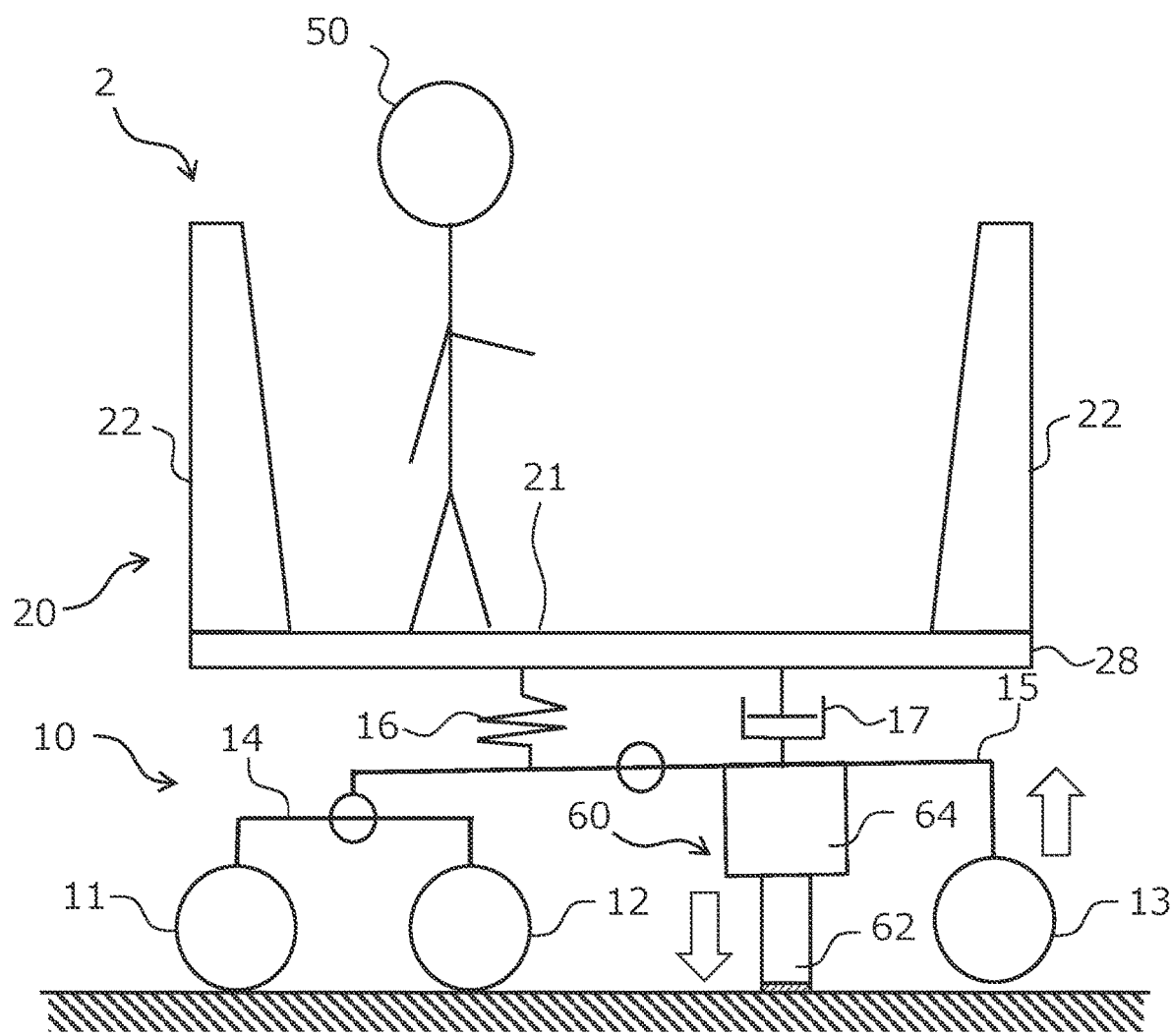
FIG. 3 shows a state of the automated traveling pallet of the first embodiment, where a moving mechanism is driven and a grounding part is abutted against a ground surface.

FIG. 3 shows the state of the automated traveling pallet of the first embodiment, where the moving mechanism is driven and the grounding part is abutted against the ground surface. As shown in FIG. 3, when the grounding part 62 is abutted against the ground surface, the rear wheels 13 float upward. As a result, the automated traveling pallet 2 is secured by a pair of middle wheels 12 and a pair of grounding parts 62, for a total of four places to provide braking force during stopping.

1-2. Configuration of Control System for Automated Traveling Pallet

Figure 4:
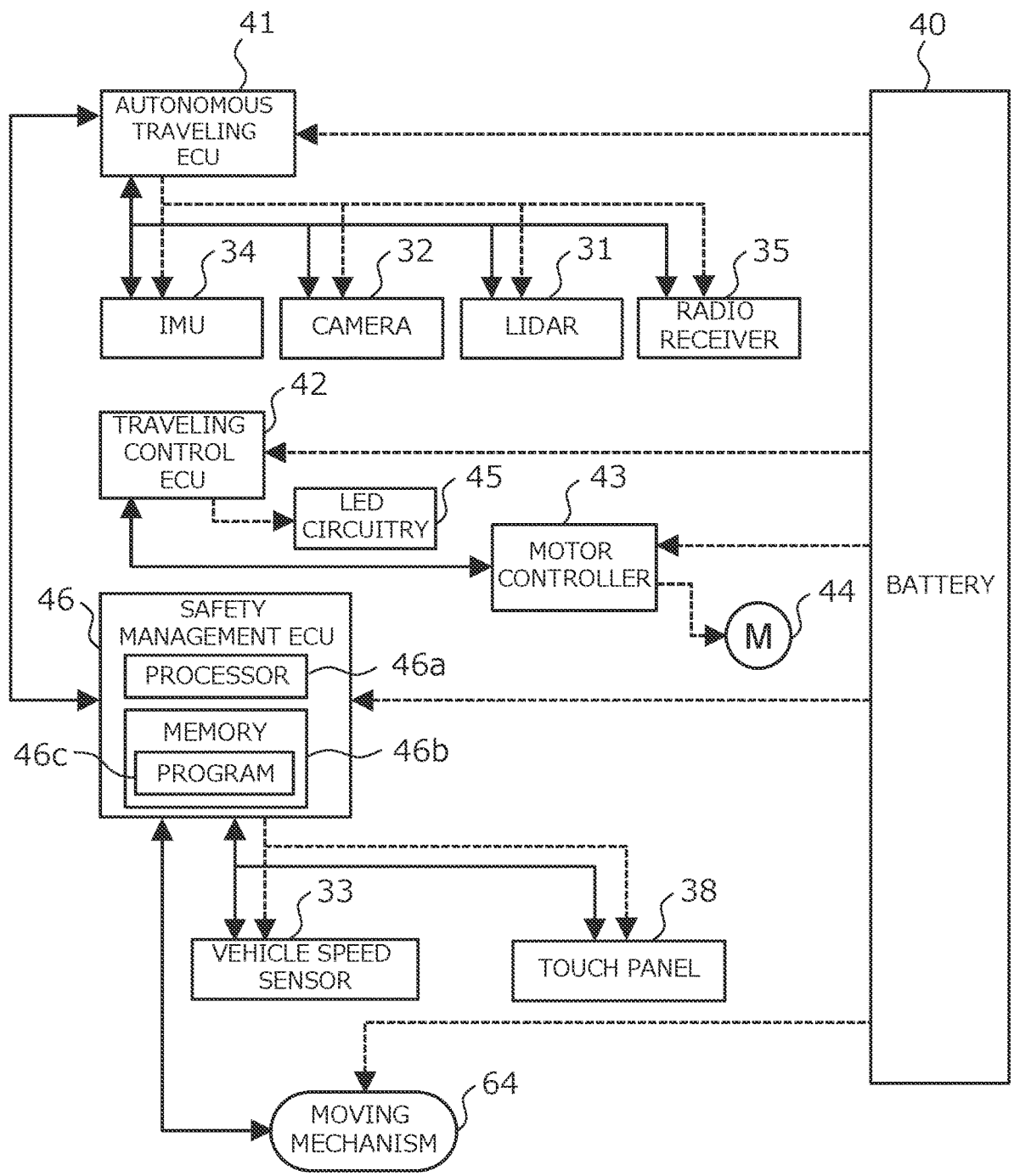
FIG. 4 is a diagram for explaining a configuration of a control system of the automated traveling pallet according to the first embodiment.

Next, the configuration of the control system of the automated traveling pallet 2 according to the first embodiment will be described with reference to FIG. 4. Three types of ECUs (Electronic Control Unit), i.e., an autonomous traveling ECU 41, a traveling control ECU 42, and a safety management ECU 46, are mounted on the automated traveling pallet 2.

The autonomous traveling ECU 41 is an ECU which controls the autonomous traveling of the automated traveling pallet 2. The autonomous traveling ECU 41 is connected to a LIDAR 31, a camera 32, an IMU 34, and a radio receiver 35. The LIDAR 31 is used for detection and ranging of an object existing around the automated traveling pallet 2. The camera 32 is used to recognize objects present around the automated traveling pallet 2. The IMU (Inertial Measurement Unit) 34 is used to measure angular velocity and acceleration of the three axes. The radio receiver 35 is used for vehicle-to-vehicle communication and road-to-vehicle communication utilizing the 920 MHz band. The autonomous traveling ECU 41 is supplied with power from the battery 40 mounted in the rocker 15. The power supply to the LIDAR 31, the cameras 32, the IMU 34, and the radio receiver 35 is provided by the autonomous traveling ECU 41.

The autonomous traveling ECU 41 has a function of communicating with control servers (not shown) by mobile communication such as 4G or 5G. The user of the automated traveling pallet 2 communicates with the control server using a user terminal, such as a smartphone or tablet PC, and transmits a desired departure point and a desired destination point to the control server. The control server selects an appropriate automated traveling pallet 2 from a plurality of available automated traveling pallets 2, and transmits the departure point and the destination point to the selected automated traveling pallet 2. The autonomous traveling ECU 41 creates a travel plan based on the departure point and the destination point received from the control server.

The autonomous traveling ECU 41 inputs a target trajectory calculated from the travel plan to the traveling control ECU 42. The traveling control ECU 42 generates a motor command value for traveling the automatically traveling pallet 2 along the target trajectory. Since the front wheels 11 and the rear wheels 13 are omni-directional wheels, it is possible to control the traveling direction along the target trajectory by controlling the difference in the rotational speed of the left and right motors. The motor command value generated by the traveling control ECU 42 is input to a motor controller 43. Further, the motor controller 43 is directly supplied with power from the battery 40. The motor controller 43 controls the power supply to the motors 44 of the left and right wheels 11, 12, and 13 according to the motor command value.

Incidentally, the automated traveling pallet 2 is provided with a lighting device (not shown). LEDs are used as the lighting device. LED circuitry 45 for lighting the LEDs is supplied with power from the traveling control ECU 42. The traveling control ECU 42 is supplied with power from the battery 40. The LED circuitry 45 may light the LED at all times, or may light the LED depending on the ambient illuminance.

The safety management ECU 46 includes a memory 46b including at least one program 46c and a processor 46a coupled to the memory 46b. The number of each of the memory 46b and the processor 46a may each be multiple. The processor 46a controls the moving mechanism 64 of the jack 60 by executing the program 46c. In other words, the safety management ECU 46 functions as a controller of the automated traveling pallet 2 according to the first embodiment. However, the function of a part as the controller of the automated traveling pallet 2 is executed by the autonomous traveling ECU 41. A vehicle speed sensor 33 and a touch panel 38 are connected to the safety management ECU 46. The safety management ECU 46 is supplied with power from the battery 40. The power supply to the vehicle speed sensor 33 and the touch panel 38 is provided by the safety management ECU 46. On the other hand, the power supply to the moving mechanism 64 is provided directly from the battery 40.

1-3. Operation of Controller

The operation of the controller according to the first embodiment will be described with reference to FIG. 5.

Figure 5:
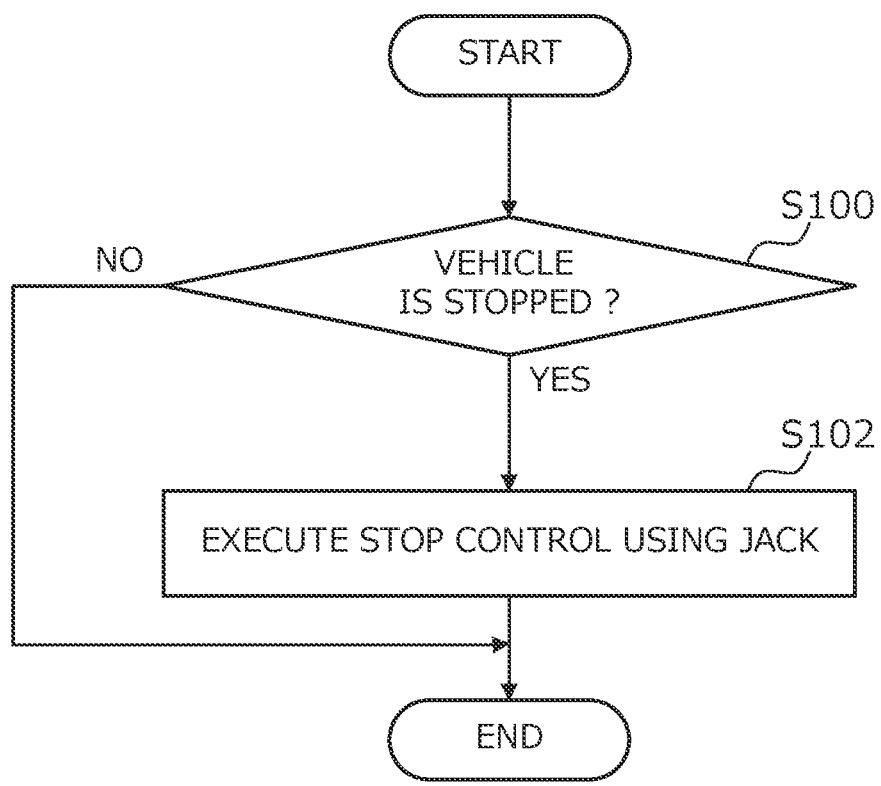
FIG. 5 is a flowchart showing a process performed during operation of the automated traveling pallet in a controller according to the first embodiment.

FIG. 5 is a flowchart showing a process performed during operation of the automated traveling pallet 2 in the controller according to the first embodiment. First, in step S100, the safety management ECU 46 determines whether the automated traveling pallet 2 is stopped based on the detected signal of the vehicle speed sensor 33. As a result, when the determination is not accepted, the routine is terminated, and when the determination is accepted, the routine proceeds to the next step S102.

In step S102, the safety management ECU 46 executes stop control using the moving mechanism 64 of the jack 60. In the stop control, in more detail, the safety management ECU 46 drives the moving mechanism 64 to push the grounding part 62 against the ground surface until the rear wheels 13 are lifted.

According to the processing as described above, it is possible to ensure that the automated traveling pallet 2 remains stationary in situations where the automated traveling pallet 2 needs to be temporarily stopped, such as when passengers are getting on or off, or when waiting at traffic lights.

1-4. Modified Examples

The automated traveling pallet 2 of the first embodiment may be modified as follows.

The automated traveling pallet 2 of the first embodiment is not limited to a vehicle for performing automated traveling, it may be a vehicle for performing manual operation. Further, the omni-directional wheel adopted in the automated traveling pallet 2 is not limited to omni-wheels. For example, the front wheels 11 and the rear wheels 13 may be configured using other known omni-directional wheels, such as a mecanum wheels. In the case where the front wheels 11 and the rear wheels 13 are mecanum wheels, the middle wheels 12, which is normal wheels, may be omitted.

The arrangement and number of the jacks 60 are not limited. That is, for example, one jack 60 may be installed between the rear wheels 13. Alternatively, one or a plurality of jacks 60 may be disposed around the front wheels 11.

In the stop control, it is not always necessary to lift until lifting the rear wheel 13, as long as the braking function in the right and left directions can be secured by pushing the grounding part 62 to the ground surface.

The stop control may be executed in response to an operation request from the occupant 50 of the automated traveling pallet 2. In this case, for example, a button for requesting execution of the stop control may be displayed on the touch panel 38. The safety management ECU 46 executes the stop control in response to the pressing of the button by the occupant 50 during the stop of the automated travel pallet 2. Alternatively, the safety management ECU 46 executes the stop control after stopping the automated traveling pallet 2 in response to the occupant 50 pressing the button during the traveling of the automated traveling pallet 2. According to such control, the occupant 50 can perform riding or getting on and off with confidence in the automated traveling pallet 2 in the stop. This modification can also be applied to an automated traveling pallet according to another embodiment described later.

Further, the stop determination of the automated traveling pallet 2 in the stop control is not limited to the method of using the vehicle speed sensor 33. That is, for example, it may be determined stop of the automated traveling pallet 2 from the motor command value of the motors 44 of the left and right wheels 11, 12, 13, it may be determined to stop from the signal of the other sensors. This modification can also be applied to an automated traveling pallet according to another embodiment described later.

2. Second Embodiment

2-1. Features of Second Embodiment

Figure 6:
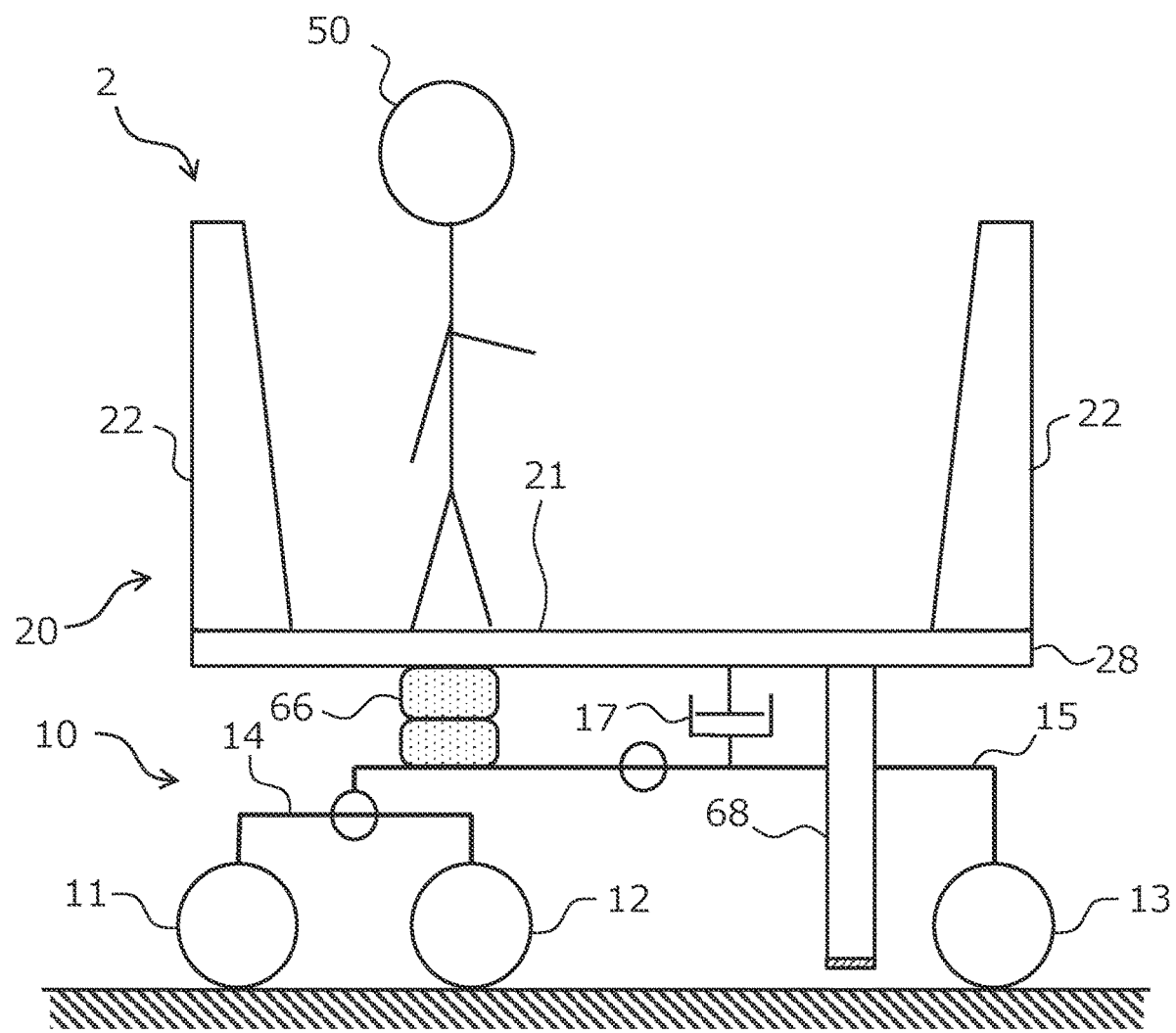
FIG. 6 is a diagram showing a schematic structure of an automated traveling pallet of the second embodiment.

FIG. 6 is a diagram showing a schematic structure of an automated traveling pallet of the second embodiment. In FIG. 6, elements common to those of the automated traveling pallet 2 of the first embodiment shown in FIG. 1 are denoted by the same reference numerals, and descriptions thereof are omitted. The automated traveling pallet 2 of the second embodiment is characterized in that it includes a ride height adjusting mechanism 66 as the moving mechanism. The ride height adjusting mechanism 66 is installed on top of the rocker 15, the vehicle body 20 is mounted thereon. That is, in the automated traveling pallet 2 of the second embodiment, the ride height adjusting mechanism 66 and the damper 17 correspond to the suspension device connected between the spring upper structure and the spring lower structure. The ride height adjusting mechanism 66 includes an air bag and an electric compressor for feeding compressed air into the air bag. The ride height adjusting mechanism 66 can change the vertical position of the spring upper structure relative to the spring lower structure by adjusting the amount of compressed air fed into the air bag.

On the lower surface side of the upper plate 28 of the vehicle body 20, the grounding part 68 is provided so as to protrude toward the ground surface from the bottom of the automated traveling pallet 2. The grounding parts 68 are provided, for example, at two positions in the vicinity of the pair of the rear wheels 13. When the ride height adjusting mechanism 66 is driven and the vehicle body 20 is lowered, the grounding part 68 is lowered accordingly. The grounding part 68 is set to a length that grounds the ground surface when the vehicle body 20 is lowered.

Figure 7:
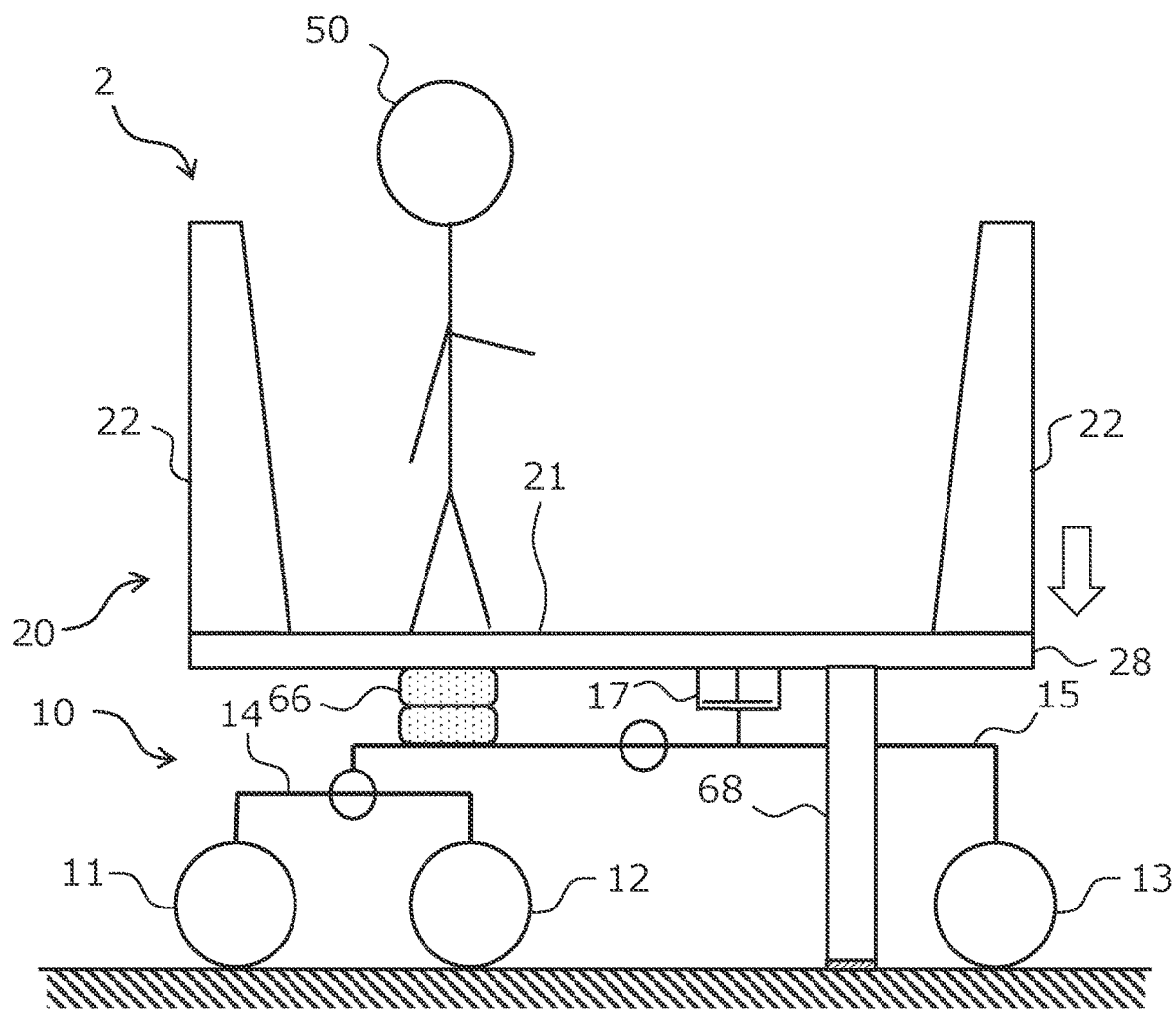
FIG. 7 shows a state in which the vehicle body has been lowered in the automated traveling pallet of the second embodiment.

FIG. 7 shows the state in which the vehicle body 20 has been lowered in the automated traveling pallet of the second embodiment. As shown in FIG. 7, when the vehicle body 20 is lowered, the grounding part 68 hits the ground surface. As a result, the automated traveling pallet 2 is secured by a pair of middle wheels 12 and a pair of grounding parts 68, for a total of four places to provide braking force.

2-2. Operation of Controller

The operation of the controller according to the second embodiment will be described with reference to FIG. 8.

Figure 8:
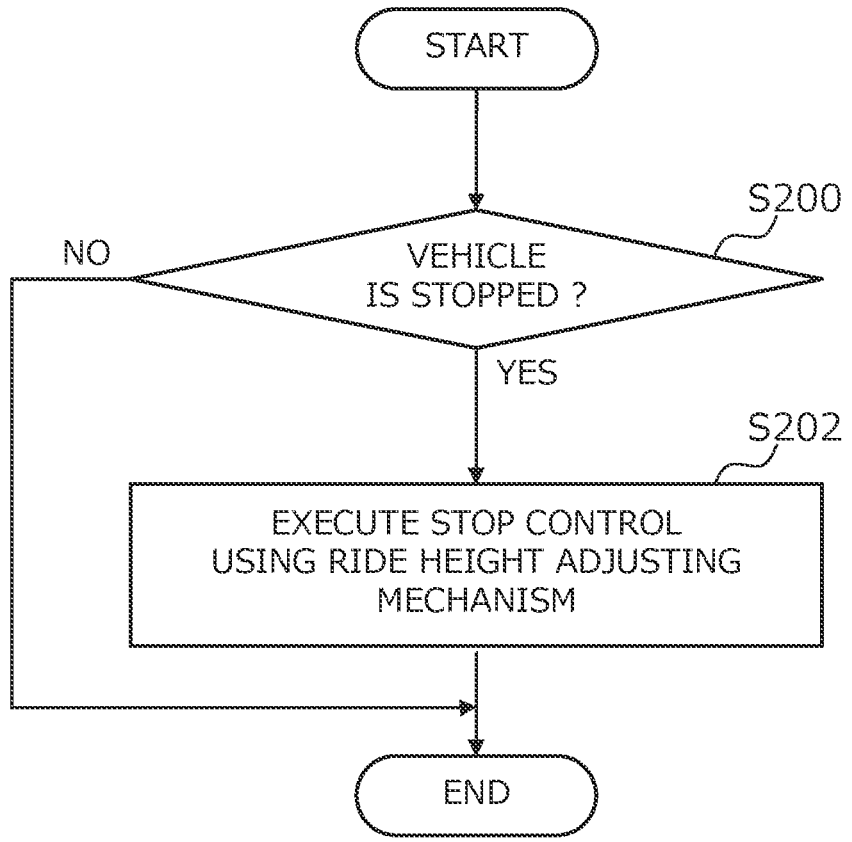
FIG. 8 is a flowchart showing a process performed during operation of the automated traveling pallet in the controller according to the second embodiment.

FIG. 8 is a flowchart showing a process performed during operation of the automated traveling pallet 2 in the controller according to the second embodiment. First, in step S200, the safety management ECU 46 determines whether the automated traveling pallet 2 is stopped based on the detected signal of the vehicle speed sensor 33. As a result, when the determination is not accepted, the routine is terminated, and when the determination is accepted, the routine proceeds to the next step S202.

In step S202, the safety management ECU 46 executes the stop control using the ride height adjusting mechanism 66. In the stop control, more particularly, the safety management ECU 46 drives the ride height adjusting mechanism 66 to lower the vehicle body 20, thereby hitting the grounding part 68 against the ground.

According to the processing as described above, it is possible to ensure that the automated traveling pallet 2 remains stationary in situations where the automated traveling pallet 2 needs to be temporarily stopped, such as when passengers are getting on or off, or when waiting at traffic lights.

2-3. Modified Examples

The automated traveling pallet 2 of the second embodiment may be modified as follows.

The arrangement and the number of the grounding parts 68 are not limited as long as they are fixed to the vehicle body 20. That is, for example, one grounding part 68 may be disposed at a position between the rear wheels 13. Alternatively, one or a plurality of grounding parts 68 may be disposed around the front wheels 11.

The ride height adjusting mechanism 66 is not limited to an air suspension mechanism with an air bag, and other known ride height adjusting mechanisms may be employed.

What is claimed is:

1. A vehicle comprising:
    a chassis including a bogie supporting front wheels and middle wheels and a rocker supporting rear wheels;
    a grounding part that supports the vehicle by grounding to a ground surface;
    a moving mechanism to protrude the grounding part from the bottom of the vehicle toward
    the ground surface;
    a vehicle speed sensor that detects a speed of the vehicle; and
    an electronic control unit configured to:
    determine whether the vehicle is stopped based on the speed of the vehicle detected by the vehicle speed sensor; and
    in response to determining that the vehicle has stopped, control the moving mechanism so as to ground the grounding part to the ground surface;
    wherein the bogie is swingably supported with respect to the rocker,
    wherein the front wheels and the rear wheels are omnidirectional wheels, and the middle wheels are normal wheels, and
    wherein the moving mechanism is installed on the rocker.
2. The vehicle according to claim 1,
    wherein the electronic control unit is configured to control the moving mechanism to ground the grounding part to the ground surface when an operation request is received from an occupant.
3. The vehicle according to claim 1,
    wherein the moving mechanism is a jack which is integrally configured with the grounding part, and is fixed to the bottom of the vehicle.
4. The vehicle according to claim 1, wherein the vehicle is an automated traveling pallet.

* * * * *